Nov. 21, 1933.    A. L. HOWARD    1,936,087
FINISHING WELT
Filed Dec. 13, 1929

INVENTOR
Albert L. Howard
by H. W. Kenway, Atty

Patented Nov. 21, 1933

1,936,087

UNITED STATES PATENT OFFICE 1,936,087

FINISHING WELT

Albert L. Howard, Brockton, Mass., assignor to Hamilton-Wade Company, Brockton, Mass., a corporation of Massachusetts Application December 13, 1929
Serial No. 413,771

2 Claims. (Cl. 155—184)

This invention relates to finishing welt or binding for use in upholstery or for decorative finish or ornamental binding. An important field of use of the invention is in the interior finish of automobiles, although the invention is of a more general application.

The purpose of my invention is to provide a composite finishing welt presenting a particularly attractive and symmetrical appearance and which may be readily and securely attached by headed fasteners which are concealed and protected by the welt.

In one aspect my invention consists in improvements in finishing welt of the type disclosed in United States Letters Patent No. 1,721,856, granted July 23, 1929. As in the welt of that patent, I contemplate a center or body bead movably secured in place and embellished with an edge or beads at one or both margins. An important feature of my invention consists in the construction and arrangement of the marginal bead whereby I am enabled to conceal the loose edge of the material and provide a smooth rounded appearance, and in case a marginal bead is employed at each edge, to locate both beads symmetrically in the welt. This I am enabled to do by forming the center bead with a laterally projecting feather, securing one edge of a body strip thereto in superposed relation and then wrapping the strip preferably about a filler cord disposed substantially above the feather. Where a marginal bead is desired at both edges of the welt, the strip is carried beneath the center bead and preferably wrapped about a second filler cord located adjacent to its other edge.

In another aspect my invention consists in a welt of the character under discussion, in which the marginal beads may be formed in different colors contrasting with each other or with the center bead. As herein shown, this result is achieved by employing a body strip divided longitudinally into materials of different character or different color. One-half of the composite strip is then utilized to form one marginal bead and the other half of the strip utilized to form the other marginal bead in a contrasting color.

These and other features of the invention will be best understood and appreciated from the following description of a preferred embodiment thereof, selected for purposes of illustration and shown in the accompanying drawing, in which Fig. 1 is a view in perspective of the center or body bead;

Figures 1, 2, 3, 4:
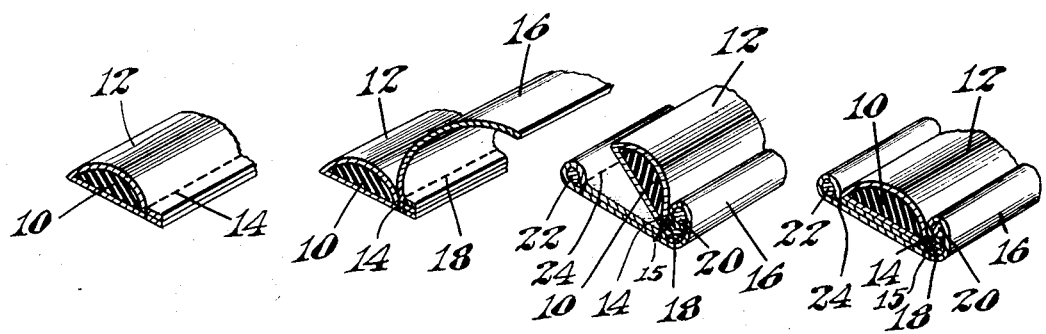
Fig. 2 is a similar view showing one edge of the body strip attached to the feather.
Fig. 3 is a similar view showing the body strip wrapped about the marginal bead fillers.
Fig. 4 is a similar view of a portion of the finished welt.

The center or body bead, as shown in Fig. 1, may comprise a curved or semi-circular filler core 10 of rubber or similar material having a sheath or covering of sheet material 12 enclosing the core and its edges, forming a laterally extending feather. The edges may be secured together, if desired, by cement or by stitches 14. It is within the scope of the invention, however, to form the center bead of an integral molded strip of any desired contour but including a feather of the general shape shown in Fig. 1.

The next step in producing the welt consists in stitching to the feather of the center bead one edge of a body strip 16 with its edge substantially registering with the outer edge of the feather and extending inwardly and then upwardly adjacent to the center bead. The edge of the body strip may be secured by a line of stitching 18 or by cement, and its material may be thin leather, tape or other textile material. The free portion of this body strip is then formed into a marginal bead preferably by wrapping the same about a filler cord 20.

Figure 5:
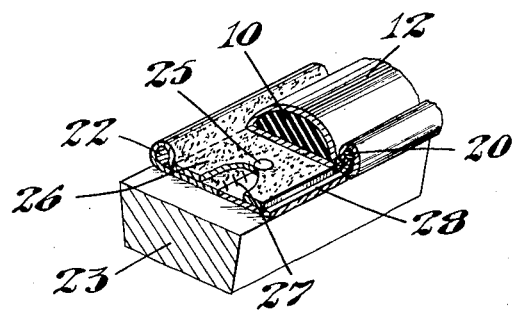
Fig. 5 is a similar view showing the welt made with a composite body strip, portions being broken away.
Figure 6:
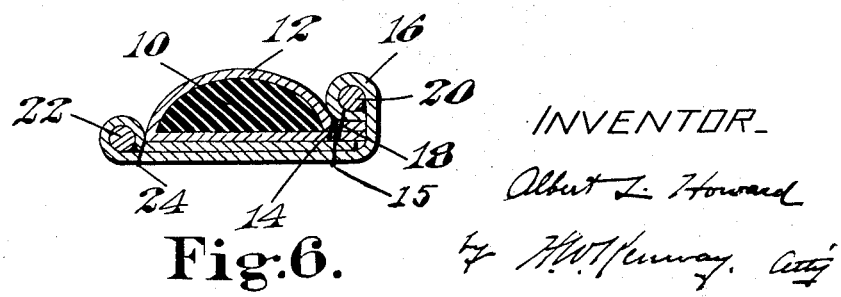
Fig. 6 is a sectional view, on an enlarged scale, of the welt shown in Fig. 4.

Referring now to Figs. 3 and 6, it will be seen that the filler cord 20 is located above the attached edge of the body strip and the superposed feather of the center bead and substantially over the line of stitching 18. The body strip 16 is wrapped about the cord 20, passing upwardly adjacent to the center bead and then outwardly and downwardly beneath the feather of the center bead. It extends across beneath the center bead and is doubled back and preferably cemented, forming a substantial anchorage or base for the attaching nails or tacks. If a bead is desired at the other margin of the center bead, the body strip is wrapped preferably about a second filler cord 22 and secured in position by a line of stitching 24. The welt is completed by being stitched through and through by stitching 15 located adjacent to the stitching 14 but extending through the doubled edge of the body strip as well as the material above it. As suggested in Fig. 3, the welt may be attached by lifting the center bead about the hinge formed by the stitching 15 at the right-hand edge of the welt, so that the attaching tacks may be conveniently driven, and then covered by replacing the center bead.

Where it is desired to form the welt with marginal beads of different colors, I employ a composite body strip comprising two sections 26 and 28, as shown in Fig. 5. These sections are shown as secured together edge to edge by stitching 27 and form in effect a single strip divided longitudinally into material of dissimilar characteristics. An integral strip having differently colored halves would serve as well. As shown in Fig. 5, the filler cord 20 located at the right edge of the welt is enclosed by the material of the section 28 of the body strip, while the filler cord 22 at the left edge of the welt is enclosed by the dissimilar section 26 of the body strip. The marginal beads, therefore, appear differently colored in the finished welt and a two-tone welt is thus produced. If a three-tone welt is desired, the covering 12 of the inner bead may be of still a third color. In Fig. 5, one of the attaching nails 25 is shown as being inserted through the double body of the composite strip into a portion 23 of the frame or molding in connection with which the welt is used.

It will be noted that the edge of the body strip 16 attached by the stitching 18 is entirely concealed in the welt and that the shape of the two marginal beads is similar and that they are symmetrically disposed with reference to the center bead. The effect of the attached bead is also symmetrical and pleasing to the eye, and from the mechanical standpoint it presents every advantage of convenience in attaching and durability in wear.

Having thus described my invention, what I claim as new and desire to secure by Letters Patent of the United States is:

1. A finishing welt having a center bead with a laterally projecting feather, a body strip stitched to said feather and extending inwardly and then upwardly adjacent to one side thereof, and then being wrapped outwardly in a manner covering the stitching and forming a seamless marginal bead at one edge of the welt and adjacent to the center bead, the free edge of the body strip being doubled beneath the center bead.

2. A finishing welt having a center bead comprising a filler enclosed in a covering whose combined edges form a feather, a body strip stitched at one edge to said feather and extending inwardly and upwardly adjacent to the center bead, a curved filler located above said attached edge and about which said body strip is wrapped to cover said stitching and form a seamless edge bead, and a second curved filler located at the other edge of said center bead and about which said body strip is doubled.

ALBERT L. HOWARD.